2,998,413
POLYTHIOETHERURETHANE CASTING AND METHOD OF PREPARING SAME

Hans Holtschmidt, Koln-Stammheim, Günther Nischk, Leverkusen, and Wilhelm Kallert, Koln-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Nov. 16, 1955, Ser. No. 547,304
Claims priority, application Germany Nov. 16, 1954
3 Claims. (Cl. 260—77.5)

This invention relates to new polyurethane plastics and to a process for making the same. More particularly, the invention is concerned with polyurethane plastics having outstanding resistance to hydrolytic degradation, which are prepared by reacting polyisocyanates with a new class of hydroxyl polythioethers.

It is known to produce valuable polyurethane plastics from polyisocyanates and polyesters containing terminal hydroxyl and/or carboxyl groups. Depending upon the choice of the starting materials and reaction conditions, these plastics can be obtained as elastic rubber-like materials, elastic or rigid foams, lacquers, films, foils, molded masses, adhesives or coatings.

In addition to good mechanical properties, all these products have excellent resistance to gasoline and oil, and as compared with corresponding products made of rubber, they have the advantage of not aging under the influence of oxygen or ozone. However, in certain fields of application, particularly in those cases where water at elevated temperature, humid air (especially under tropical conditions), acids, bases, amines and sometimes also alcohols act on the polyester-polyurethane plastics, an undesirable hydrolytic, aminolytic or alcoholytic attack on the ester bonds of the macromolecule becomes apparent. This attack, which results in a swelling, then in a degradation and finally in the destruction of the plastic material, is accelerated catalytically by some of the catalysts which may be added to the polyesters prior to the reaction with the polyisocyanates.

For this reason, attempts have been made to replace the polyesters by polyethers as formed by alkoxylation of polyhydric alcohols with alkylene oxides. The suitability of polyethers derived from cyclic, polymerizable ethers, such as tetrahydrofuran, for the production of polyurethane plastics has also been investigated. All the polyethers heretofore used, however, have the disadvantage of being hydrophilic so that the plastics produced therefrom with polyisocyanates are attacked by water as may be seen from an initial swelling and a subsequent destruction of the material. If the hydrophilic character of the polyethers is eliminated by using aromatic or cycloaliphatic epoxides, such as phenoxypropene oxide or cyclohexene oxide, for their production, there are obtained in the subsequent reaction with polyisocyanates polyurethane plastics that exhibit no longer any elasticity and are much too brittle for most purposes.

It is an object of the present invention to provide polyurethane plastics which combine the desirable properties of the known polyurethane plastics with resistance to hydrolysis. Another object is to provide polyurethane plastics which may be easily prepared. A further object is to improve the art. Still further objects will appear hereinafter.

It has now been found that polyurethane plastics of outstanding characteristics can be obtained by reacting polyisocyanates with polythioethers containing terminal hydroxyl groups, the polythioethers being characterized by having a molecular weight within the range of 800 to 10,000.

It is also known to produce polythioethers which contain oxygen and sulphur bridges in their molecules by heating about 4 to 15 parts by weight of an alkylene glycol with 1 part by weight of bis-($\beta$-hydroxyethyl)-sulphide at temperatures of between 150° to 300° C. in the presence of acid catalysts. In this way there are obtained polythioethers of comparatively low molecular weight (400 to 900) which are suitable for use as lubricants, oils for hydraulic presses and plasticizers. These known polythioethers, however, are not suitable as starting materials for the formation of plastics since their molecular weight is too low. In addition, the yield in the production of these products by the method indicated is unsatisfactory so that relatively large amounts of unreacted monomeric alcohols must be removed upon completion of the reaction.

It has now been found that a new class of polythioethers containing terminal hydroxyl groups and having molecular weights within the range of 800 to 10,000 can be produced in practically quantitative yield by reacting a polyhydric alcohol with a thioether glycol in a molar ratio within the range of about 1:1 to about 1:1.5, using temperatures ranging from about 100° to about 300° C., preferably within the range of 150° to 250° C., and a dehydration catalyst to accelerate the reaction. The polythioethers thus produced are hydrophobic and eminently suitable for producing polyurethane plastics in accordance with the present invention.

It has also been found that in addition to the acid esterifying catalysts formerly used in the preparation of polythioethers the esters of aliphatic and aromatic sulphonic acids may be employed as catalysts. The use of sulphonic acid esters as esterifying catalysts offers the advantage that the polythioethers obtained in their presence are free from traces of acid substances, this being of particular importance in the subsequent reaction of the polythioethers with polyisocyanates.

Examples of polyhydric alcohols which may be used in the production of polythioethers include ethylene glycol, 1,3-butylene glycol, 1,4-butylene glycol, 1,5-amylene glycol, 1,6-hexylene glycol, trimethylol propane, glycerol, hexanetriol, pentaerythritol and mannite. Furthermore, mixed aromatic-aliphatic glycols, such as p-xylylene glycol, dihydroxyethyl hydroquinone, dihydroxyethyl-1,5-dihydroxy-naphthalene and the 4,4'-di-($\beta$-hydroxyethyl)-ether of 4,4'-dihydroxy-diphenyl-dimethyl methane, may also be used in the present process. Diethylene glycol, triethylene glycol and higher homologues thereof are on the other hand less suitable as starting substances, since too many hydrophylic ether-oxygen atoms are introduced by such components into the polythioethers being formed.

Examples of thioether glycols suitable for use in the process of the invention are thiodiglycol, 3,3'-dihydroxypropyl sulphide, 4,4'-dihydroxybutyl sulphide and mixed aromatic-aliphatic thioether glycols, such as 1,4-($\beta$-hydroxyethyl)-phenylene dithioether, and also analogous compounds of the naphthalene- and diphenylmethane series.

An advantageous mode of preparing the polythioethers of the invention involves heating to a temperature of 150°–200° C. a substantially equimolecular mixture of polyhydric alcohol and thioether glycol with the addition of a small amount, preferably 0.1 to 0.5% by weight, based on the weight of the mixture, of a sulphonic acid ester. Water is split off at this temperature, this being completed in about 3 to 6 hours, depending upon the amount of catalyst. By utilizing a vacuum at the end of the reaction, the last residues of the water of reaction are split off and the polycondensation is completed.

The progress of the condensation can be followed by continual determination of the OH number or the viscosity of the melt. By choosing suitable reaction times, which can easily be determined empirically in the manner indicated, it is possible to produce polythioethers of different molecular weights. On the other hand, it is readily possible to form polythioethers of different structures, since linear polythioethers are formed when dihydric alcohols are used as the polyhydric alcohol component, while branched polythioethers are formed when trihydric alcohols or alcohols of higher valency are employed as the polyhydric alcohol component. The degree of branching of the polythioethers may be varied as desired by using mixtures of dihydric and trihydric or tetrahydric alcohols.

One particular advantage of the process of the instant invention is that it can be carried out in a minimum amount of time. Another attractive feature of this novel process is that no losses in yield are caused by ring-closing reactions and no monomeric products have to be removed at the end of the reaction.

To produce the polyurethane plastics of the invention, the new polythioethers or mixtures thereof with polyesters containing terminal hydroxyl and/or carboxyl groups are reacted with polyisocyanates under reaction conditions that bring about chain-lengthening and cross-linking. In this reaction any compound containing two or more isocyanate groups may be used as the polyisocyanate component. Illustrative examples of polyisocyanates which may be reacted with the new polythioethers include tetramethylene diisocyanate, hexamethylene diisocyanate, p-phenylene diisocyanate, p,p'-diphenyl methane diisocyanate, alkyl as well as cycloalkyl derivatives thereof, 1,2,4-toluylene diisocyanate, 1,2,6-toluylene diisocyanate and mixtures thereof, 1,5-naphthylene diisocyanate, triphenyl-methane-4.4',4''-triisocyanate and reaction products of polyhydric alcohols with excess diisocyanate, such as the reaction product of 1 mol trimethylol propane with 3 mols of toluylene diisocyanate. So-called blocked or hidden polyisocyanates, which may be prepared by reacting polyisocyanates with phenols or dialkyl malonates and which upon heating are converted into the underlying free polyisocyanates, may also be reacted with the new polythioethers to form the polyurethane plastics of the invention.

Depending upon the particular compounds and reaction conditions used in the reaction between the polythioethers and the polyisocyanates, polyurethane rubbers, foams, coatings, adhesives, lacquers, films or molded articles may be produced.

Thus, high-grade materials of rubber-like characteristics are obtained by reacting at elevated temperature substantially linear polythioethers of the above-described type with an amount of diisocyanate in excess of that necessary for a mere lengthening of the chain and heating the isocyanate-modified polythioether thus formed with a cross-linking agent, such as an alkylene glycol, a diamine or water, to form a cross-linked polyurethane rubber. Alternatively, a substantially linear polythioether of the type disclosed heerin may be reacted with excess diisocyanate to obtain an isocyanate-modified polythioether containing free isocyanate groups, whereupon this product is reacted with a diamine and/or a glycol in such an amount as to produce a storage stable intermediate containing free amino and/or hydroxyl groups. The storage stable intermediate is then cured in a second process step by reaction with a further amount of diisocyanate to thereby form a rubber-like material. The material can be shaped during its formation or at a later stage.

To produce a polyurethane foam a polythioether of the type described herein is reacted with excess polyisocyanate and a minor amount of water in the presence of an accelerator and a surface active agent. As accelerators there may be used heavy metal compounds, phenates and tertiary amines, such as hexahydrodimethyl aniline and the adipic acid ester of N-diethyl ethanol-amine, while diethylamine oleate, Turkey red oil, high molecular alkyl and alkyl-aryl sulfonates and alkoxylation and sulfonation products of fatty alcohols may be employed as surface active agents. In the foaming process there are ordinarily used 0.5 to 1.5 mol of diisocyanate per 1 mol of OH contained in the polythioether. Water, accelerator and surface active agent are employed in amounts of 0.5 to 5% by weight, 0.1 to 5% by weight and 0.5 to 10% by weight, respectively, based on the weight of the polythioether. Whereas substantially linear polythioethers having an hydroxyl number below 150 will react with polyisocyanates to form elastic foams, rigid foams are obtained if a polyisocyanate is reacted with a branched polythioether having an hydroxyl number above 150.

Lacquers, coatings and films are formed if predominently branched polythioethers of the above type are dissolved with a polyisocyanate or a substance splitting off polyisocyanates in an inert solvent, such as an ester, ether or ketone, the solution thus prepared is applied to the article to be lacquered or to the material to be coated, and the solvent is then evaporated in the cold or with heating.

Finally, molded masses can be produced by mixing a polythioether of the above-described type with a polyisocyanate, using such proportions as to provide a substantially equi-molecular ratio of hydroxyl and isocyanate groups, adding a relatively large amount of a suitable filler, such as sawdust, chalk, carbon black, iron oxide or colloidal silica, and thereafter causing polyaddition and cross-linking to take place under pressure at elevated temperature.

An important feature of the new polythioethers is that they are compatible with polyesters having terminal hydroxyl and/or carboxyl groups, so that mixtures of polythioethers and polyesters can be used in any desired proportions for the production of polyurethane plastics according to the present invention.

The elastic rubber-like materials, foamed products, lacquers, films and coatings prepared in accordance with the invention show a remarkable resistance to chemical agents, especially those which exert a saponifying influence on polyester products, such as bases, acids, amines, alcohols, water and steam. Aqueous caustic soda solution, dilute sulfuric acid, oils with special additives, such as emulsifiers, high-pressure additives and other substances, by which the corresponding polyester products are destroyed after a short time, do not have any appreciable effect on the mechanical properties of the products produced from the new polythioethers, even at elevated temperatures. It is only the action of hot alcoholic alkali solutions which causes destruction after a relatively long time, due to attack on the urethane groupings.

The physical properties of the new polyurethane plastics show the following advantages: The tearing strength of the foamed products is sometimes considerably higher than that of the corresponding products derived from polyesters; as regards the rubber-like elastic materials, a feature to be particularly emphasized is the elasticity which is higher (with equal breaking elongation and permanent elongation) than that of the polyester products. The Shore hardness of the rubber-like materials can be adjusted to any desired value within the range of about 55° to 96° C.

Even polyurethane plastics obtained from mixtures of polythioethers and polyesters exhibit an enhanced resistance to saponifying influences as compared with conventional polyurethane plastics made from polyesters as the only hydroxyl group containing component.

The invention is further illustrated by the following examples without being limited thereto, parts indicated being by weight.

*Example 1*

122 parts of thiodiglycol are heated with 118 parts of 1,6-hexanediol upon addition of 0.5% of p-toluene sulfonic acid methyl ester. Water is split off in a violent reaction at 160 to 170° C. After a reaction period of 3 to 4 hours the OH number is 110. By further condensation in water jet vacuum the OH number is lowered to 58, which takes another 1–2 hours. When the condensation is complete, superheated steam is blown through the reaction mass for about another 30 minutes at 150° C. After being dried in vacuo, the prepared polyether constitutes a wax-like brownish mass which melts at about 35° to 40° C. and which is soluble in the conventional organic solvents, such as chloroform, benzene, acetone, etc. The product is completely insoluble in water.

500 g. of this polyether are mixed by stirring at 120° C. with 95 g. of 1,5-naphthylene diisocyanate. The reaction is complete after 8 minutes and the thinly viscous material which is obtained is stirred with 10 g. of a mixture consisting of 10 parts of 1,4-butylene glycol and 3 parts of trimethylol propane and poured into waxed molds heated to 110° C. The rubber-like moldings can be removed after about half an hour.

After 6 months in water at a temperature of 110° C. the material described does not show any damage. A corresponding material made of a polyester is destroyed after about 15 days under these conditions.

*Example 2*

122 parts of thiodiglycol are initially stirred for 4 hours at 110° C. with 90 parts of 1,4-butanediol and 0.5% of p-toluene sulfonic acid methyl ester, the temperature thereafter being raised to 160° C. At this temperature most of the water is split off. After 5 hours, a water-jet vacuum is applied and by continuously taking samples, the degree of etherification is determined by reference to the OH numbers. The condensation is stopped when the OH number is 56. The catalysts can be destroyed by methanolic caustic soda solution or ammonia. The product is a yellowish-brown viscous oil having the same properties as regards solubility as the product of Example 1.

90 g. of 1,5-naphthylene diisocyanate are mixed by stirring at 126° C. with 500 g. of this polyether. After 7 minutes, the reaction is complete and after mixing 10 g. of 1,4-butylene glycol therewith by stirring, the mixture can be poured into waxed molds heated to 110° C. The rubber-like elements removed from the mold after 30 minutes shows the following test values after being finally heated for another 24 hours at 110° C.: tensile strength 130 kg./cm.$^2$, breaking elongation 600%, permanent elongation 24%, loading at 20% elongation 13 kg./cm.$^2$, loading at 300% elongation 75 kg./cm.$^2$, ring structure 15, elasticity 59, Shore hardness 84.

No deterioration in the physical properties is observed after keeping the product for 14 days in 5% sulfuric acid and also in 7% caustic soda solution at 90° C. Under the same conditions, an elastic plastic derived from a polyester is completely decomposed in about 3 days.

*Example 3*

122 g. of thiodiglycol are condensed according to Example 1 with 62 parts of glycol and 0.25% of p-toluene sulfonic acid methyl ester. The condensation is stopped at an OH number of 63. The polyether is a light-yellow viscous oil and is also of hydrophobic character.

190 g. of 1,5-naphthylene diisocyanate are mixed by stirring with 1000 g. of this polyether at 124° C. The reaction is complete after 9 minutes. After stirring in 21 g. of 1,4-butylene glycol, the mixture is poured into waxed molds heated to 110° C. The rubber-like moldings can be removed from the mold after 35 minutes and show the following values after having been heated for a further 24 hours at 110° C.: tensile strength 140 kg./cm.$^3$, breaking elongation 700%, permanent elongation 28%, loading at 20% elongation 11 kg./cm.$^2$, loading at 300% elongation 69 kg./cm.$^2$, ring structure 17 kg., elasticity 62%, Shore hardness 87.

No deterioration of the physical properties is observed after this material has been stored for 60 days at 95° C. in a gear oil which contains a high pressure additive. An elastic material consisting of diisocyanates and polyesters and prepared by the same method is strongly damaged after being in this oil for 7 days.

*Example 4*

200 g. of the polyether according to Example 1 are mixed with 300 g. of a polyester having terminal OH groups (OH number: 54) and prepared by thermal esterification of adipic acid and ethylene glycol. This mixture is stirred at 125° C. with 92 g. of 1,5-naphthylene diisocyanate. The reaction is terminated after 10 minutes. Upon addition of 10 g. of 1,4-butylene glycol, the mass is poured into waxed molds heated to 110° C. The removal from the molds can take place after 35 minutes. The final heating lasts 24 hours.

After the material thus obtained has been kept for 3 months in water at a temperature of 100° C. only a slight deterioration of the physical properties is observed. An elastic plastic made from diisocyanate and polyester is completely destroyed after about 3 weeks under these conditions.

*Example 5*

In order to produce an elastic foamed product, 100 g. of the polyether prepared from thiodiglycol and 1,4-butylene glycol as described in Example 2 and having the OH number 74 are mixed with 3 g. of an accelerator (adipic acid ester of N-diethyl ethanolamine), 2 g. of an emulsifier (diethylamine oleate) and 1.5 g. of water. 29 g. of an isomer mixture containing about 70 parts of 1,2,4-toluylene diisocyanate and about 30 parts of 1,2,6-toluylene diisocyanate are added to this mixture and thoroughly mixed by means of a high-speed stirrer. A highly elastic foam is formed, which is cured after a short time and has the following physical properties: bulk weight 73 kg./m.$^3$, elasticity 34%, tearing strength 1.13 kg./cm.$^2$, breaking elongation 199%.

The saponification number of this foam (saponification with alcoholic KOH) is 30, while it is of the order of 350 to 400 with a corresponding foam built up of polyesters. The resistance to saponifying influences is the same as with the products described in Examples 1, 2, 3 and 4. The product is also not changed after being kept in 3% $H_2O_2$ solution.

*Example 6*

100 g. of a polyether prepared as described in Example 1, OH number 120, are mixed with 1 g. of hexahydro-dimethyl aniline and 2 g. of diethylamine oleate. After adding 1 g. of water and 33 g. of the isomer mixture of toluylene diisocyanate (see Example 5), the foaming process is initiated by vigorous stirring. The elastic foam obtained has the following physical values: bulk weight 102 kg./m.$^3$, elasticity 32%, tearing strength 1.65 kg./cm. After being boiled, the tearing strength dropped only by a very small amount and was 1.45 kg./cm. The saponification number was 66.

*Example 7*

100 g. of the polyether of Example 3 and 100 g. of a weakly branched polyester, prepared by thermal esterification of 1 mol of adipic acid, 1 mol of diethylene glycol and ½₇ mol of trimethylol propane, with the OH number 60, are mixed with 6 g. of hexahydro-dimethyl aniline and 4 g. of diethylamine oleate. The foaming process is initiated by adding 3 g. of water and 56 g. of a toluylene diisocyanate isomer mixture (see Example 5). The elastic foam has the following values: bulk weight 73 kg./m.$^3$, breaking elongation 156%, elasticity 25%, tearing strength 0.63 kg./cm. The saponification number is 180. The product has a considerably higher resistance to saponification than the pure polyester foam.

Example 8

In order to produce a rigid foam, 100 g. of a branched polyether with the OH number 263, made from 4 mols of thiodiglycol, 2 mols of trimethylol propane and 1 mol of ethoxylated hydroquinone

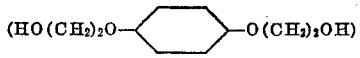

are mixed with 2 g. of hexahydrodimethyl aniline, 2 g. of emulsifier and 2 g. of Turkey red oil. After adding 10 g. of siliceous chalk, 5.4 g. of water and 54 g. of a toluylene diisocyanate isomer mixture (see Example 5), and after stirring, a rigid foam is obtained which shows the following values: bulk weight 91 kg./m.$^3$, compressive strength 3.28 kg./m.$^3$, saponification number 58.

Example 9

366 parts of thiodiglycol are condensed according to Example 1 with 177 parts of hexanediol and 134 parts of trimethylol propane with addition of 0.5% of p-toluene sulphonic acid methyl ester. The condensation is stopped at an OH number of 298. The polyether is a very viscous light yellow water-insoluble substance which is soluble in the conventional lacquer solvents.

50 parts of acetic ester are now added to 100 parts of this polythioether and 125 parts of a 75% solution of an addition product of 3 mols of toluylene diisocyanate with 1 mol of trimethylol propane are added thereto by stirring. The NCO number of this 75% solution in acetic ester is 18.

This solution is applied in a dilute layer to wood, glass or metal. The film dries thereon in a completely non-tacky manner after three hours, and has excellent properties with respect to saponifying influences.

Example 10

244 parts of thiodiglycol are condensed as described in Example 1 with 608 parts of 4',4'-di-(β-hydroxyethyl)-ether of 4,4'-dihydroxy-diphenyl-dimethyl methane of the formula

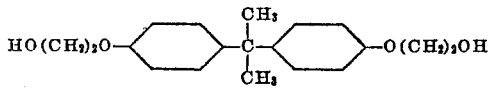

with addition of 0.2% of p-toluene sulfonic acid ethyl ester. Water is split off at 130° C. When the OH number has reached 110, the product is so viscous that it can no longer be stirred. In the cold state, it is a spring-hard resin.

25 parts of acetic ester and 25 parts of cyclohexanone are mixed by stirring with 100 parts of this polythioether. For cross-linking purposes, there are then added 46 parts of the triisocyanate referred to in Example 9, with the NCO number of 18. After being applied to wood or metal, the product solidifies in 2 hours to form a completely insoluble film which is very resistant to scratching and saponification.

The above description and examples are intended to be illustrative only. Any modification of or variation therefrom which conforms to the spirit of the invention is intended to be included within the scope of the claims.

What is claimed is:

1. A polyurethane casting obtained by a process which comprises reacting an excess of an organic polyisocyanate in a first step with a polythioether having terminal hydroxyl groups and having a molecular weight within the range of from about 800 to about 10,000, said polythioether having been formed by heating a monomeric thioether glycol with a polyhydric alcohol in the molar ratio of from about 1 to 1.5 mols of thioether glycol per mol of polyhydric alcohol to a temperature within the range of from about 100° C. to about 300° C., and thereafter mixing the resulting liquid product with a polyhydric alcohol containing 2 to 3 hydroxyl groups, pouring the resulting liquid mixture into a mold, and curing the liquid at a temperature of about 110° C. for at least about 24 hours until a completely cured solid polyurethane is formed.

2. A method for making a polyurethane casting which comprises reacting an excess of an organic polyisocyanate in a first step with a polythioether having terminal hydroxyl groups and having a molecular weight within the range of from about 800 to about 10,000, said polythioether having been formed by heating a monomeric thioether glycol with a polyhydric alcohol in the molar ratio of from about 1 to 1.5 mols of thioether glycol per mol of polyhydric alcohol to a temperature within the range of from about 100° C. to about 300° C., and thereafter mixing the resulting liquid product with a polyhydric alcohol containing 2 to 3 hydroxyl groups, pouring the resulting liquid mixture into a mold, and curing the liquid at a temperature of about 110° C. for at least about 24 hours until a completely cured solid polyurethane is formed.

3. The product of claim 1 wherein the organic polyisocyanate is p,p'-diphenyl methane diisocyanate.

References Cited in the file of this patent

UNITED STATES PATENTS

| | | |
|---|---|---|
| 2,518,245 | Morris et al. | Aug. 8, 1950 |
| 2,692,873 | Langerak | Oct. 26, 1954 |
| 2,692,874 | Langerak | Oct. 26, 1954 |
| 2,726,219 | Hill | Dec. 6, 1955 |
| 2,780,350 | Simon et al. | Feb. 5, 1957 |
| 2,835,654 | Carter et al. | May 20, 1958 |
| 2,871,227 | Walter | Jan. 27, 1959 |
| 2,900,368 | Stilmar | Aug. 18, 1959 |

FOREIGN PATENTS

| | | |
|---|---|---|
| 894,134 | France | Dec. 14, 1944 |